(12) United States Patent
Kostrun

(10) Patent No.: US 10,153,916 B1
(45) Date of Patent: Dec. 11, 2018

(54) METHOD AND DEVICE FOR CONTROLLING A LIGHTING SYSTEM

(71) Applicant: OSRAM GmbH, Munich (DE)

(72) Inventor: Marijan Kostrun, Rowley, MA (US)

(73) Assignee: OSRAM GMBH, Munich (DE)

(*) Notice: Subject to any disclaimer, the term of this patent is extended or adjusted under 35 U.S.C. 154(b) by 0 days.

(21) Appl. No.: 15/826,803

(22) Filed: Nov. 30, 2017

(51) Int. Cl.
*H05B 37/02* (2006.01)
*H04L 12/28* (2006.01)
*H04L 12/40* (2006.01)
*H04L 12/46* (2006.01)
*H04L 12/24* (2006.01)
*H05B 33/08* (2006.01)

(52) U.S. Cl.
CPC ...... *H04L 12/40013* (2013.01); *H04L 12/281* (2013.01); *H04L 12/282* (2013.01); *H04L 12/2809* (2013.01); *H04L 12/46* (2013.01); *H04L 41/0869* (2013.01); *H05B 33/0842* (2013.01); *H05B 37/0254* (2013.01)

(58) Field of Classification Search
CPC ............ H05B 37/0272; H05B 37/0227; H05B 37/0245; H05B 37/0218; H05B 33/0854; H05B 37/0254; H05B 33/0803; H05B 33/0809; H05B 33/0842; H05B 37/02; H05B 37/0263; H05B 37/034; H05B 33/0848; H05B 33/0863; H05B 37/00; H05B 37/03; F21Y 2115/10; H04L 2012/2841; H04L 12/282; H04L 12/2803; H04L 12/2836; H04L 63/10; H04L 69/18; H04L 61/6081; Y02B 20/48; Y02B 20/44; Y02B 90/2638

See application file for complete search history.

(56) References Cited

U.S. PATENT DOCUMENTS

| 8,330,395 | B2* | 12/2012 | Hoschopf | H05B 37/0272 315/307 |
| 9,596,738 | B2* | 3/2017 | Catalano | H05B 33/0872 |
| 9,609,725 | B2* | 3/2017 | Bosua | H05B 33/0857 |
| 9,913,351 | B2* | 3/2018 | Unoson | H05B 37/0272 |
| 9,918,373 | B2* | 3/2018 | Cartrette | H05B 37/0272 |
| 2003/0036807 | A1* | 2/2003 | Fosler | H05B 37/0254 700/3 |
| 2004/0225811 | A1* | 11/2004 | Fosler | H05B 37/0254 710/305 |
| 2009/0278472 | A1* | 11/2009 | Mills | H05B 37/0272 315/294 |

FOREIGN PATENT DOCUMENTS

EP 2461252 A1 6/2012

* cited by examiner

Primary Examiner — Vibol Tan
(74) Attorney, Agent, or Firm — Viering Jentschura & Partner MBB

(57) ABSTRACT

A controller for accessing a network of lighting system devices, the controller comprising: a communication subsystem configured to allow the controller to be identified as a node on the network, and to communicate according to a first protocol with at least one of said lighting system devices on the network; wherein the controller is configured to detect the presence of a Master lighting system device on the network via the first protocol; wherein the controller is configured to assume a role based on the detection.

19 Claims, 4 Drawing Sheets

| | MASTER 460 | SLAVE 430 |
|---|---|---|
| DALI_OUT | RX | $\overline{RX}$ |
| DALI_IN | TX | $\overline{TX}$ |
| DALI_SELECT | 1 | 0 |

METHOD AND DEVICE FOR CONTROLLING A LIGHTING SYSTEM

TECHNICAL FIELD

Various aspects of this disclosure relate generally to a controller and methods in lighting which are intended to control other devices and systems that produce lighting.

BACKGROUND

Digital Addressable Lighting Interface (DALI) is a network-based system which may control lighting in building automation and is a standard communication protocol intended to control light sources. The hierarchical network is comprised of two basic types of devices: single DALI Master and multiple DALI Slaves, where the format of the data transferred over the network differs between DALI Master and DALI Slaves. DALI Slave is synonymous for a light-producing system in connection with a DALI bus. These light producing systems are sometimes called Electronic Control Gears (ECGs). Besides ECGs, there may be other devices on the DALI network, for example sensors. A DALI Master, or Master lighting device, is a special controller, which when connected to the DALI network, provides power for the operation of DALI slaves and implements the DALI communication protocol. The main feature of the protocol is that a DALI Master initiates all communication, such as sending queries and setting parameters, to which DALI Slaves, in some cases, may respond or, in other cases, need not respond.

In one case, two separate devices, Master and Slave were used on the network. However, this case introduced the problem of how to implement the devices such that both Master and Slave communicated with a single micro-controller, considering the isolation requirement of both Master and Slave. Implementation of both in a single microcontroller increases the complexity of how the two interfaces are managed, as the Slave needs to run continuously, e.g. to check whether there is a Master on the Slave's network, while the Master may be turned on depending on internal logic.

In a known example of DALI functionality, an interface bridge is placed between a standard input-output (I/O) computer port and a DALI interface. The bridge uses a standard Digital communication interface to receive and send data to a supervising device.

In another known example, a controller may automatically recognize a light control network, and utilizes what is called "bus controller" in mixed mode operation. The DALI network is detected by the controller and sends commands as DALI Master through such network, thereby combining DALI Master and Slave functions.

SUMMARY

The present disclosure relates to controllers and methods in lighting, LED lighting in particular, which are intended to control other devices and systems that produce light.

In some applications, it is advantageous to have both functionality, for instance in DALI Systems, a DALI Master and a DALI Slave, in the same controller, where the two functionally exclude each other in that the controller is either a DALI Master or a DALI Slave.

The controller advantageously recognizes that two functionalities, of DALI Slave and DALI Master, are not needed simultaneously. In fact, it recognizes if there are other Masters on the network, and in such case, may stop being a Master and become a Slave. Similarly, when and/or if the controller needs to communicate with other DALI Slaves on the network, it may turn the Master role on, and initiate the necessary communication. Upon completion of the tasks, the Master role may be turned off, and the disclosed controller switched back to its default Slave mode of operation, which may save energy. Because of the similar Master and Slave circuits, the circuit may be simplified as it requires only one network to be isolated as opposed to two networks for the case of separate Master and Slave devices.

With the advent of control techniques, it may be advantageous to equip existing DALI installations with special DALI bridges, which may include: (1) the controllers that may receive commands by other means then DALI, i.e. through digital communications such as UART, SPI, or I2C; and on the other hand able to transmit that and other information to local DALI network; and (2) because DALI infrastructure is already in place, a specialized DALI Master may be connected to the same DALI network, in which case, the special DALI bridge assumes a role of DALI Slave, and may receive commands and respond to queries just like other DALI Slaves.

The special DALI bridge, in the absence of other DALI Masters may act as a DALI Master, or if a DALI Master is present, then the special DALI bridge may assume the role of a DALI Slave. The special DALI bridge may be described as DALI Slave and Master-on Demand.

Additionally, it may be advantageous for the controller to be modular in the sense that it may be part of, e.g. plugged into, a master or main microcontroller which may other functions besides being a DALI Master, e.g., the main microcontroller may be part of the lighting network that allows each light source to be addressable, in the sense that the light level may be set remotely, or the operating status and conditions may be retrieved for each individual source for the purpose of monitoring or maintenance. While the controller may contain a pluggable module for the main microcontroller with which it communicates through a digital communication channel, certain functionality may be transferred to the controller such that the main microcontroller may not be necessary. For instance, the controller may be connected through digital communication channel with wireless or radio or Zigbee module, and so, in effect, create a bridge to the DALI network which is able to control DALI devices through such an interface, while allowing direct control of the ECGs to devices that may be connected to the DALI network.

The controller may comprise a DALI communication subsystem, DALI Master Power Supply and a microcontroller which may provide control logic. The control logic allows the controller to operate in various modes.

Default mode of operation for a DALI controller is a DALI Slave. In which case, master power supply is turned off through a logic input selector, DALI_SELECT, by the microcontroller. As a DALI Slave, it is only the communication subsystem which is operational, and it is in this mode that the microcontroller is capable of receiving data and commands from another DALI Master on the network. When the controller is a DALI Slave the logic levels are reversed.

When the controller is operating as a DALI Master, first it may activate the master power supply, which provides the voltage that drives the DALI network. The same communication subsystem is used for sending and receiving messages on the network. Logic levels are not reversed in this configuration.

Arbitration as to whether the controller acts as a DALI Slave or DALI Master depends on the internal logic being executed by the microcontroller. The conflict may occur when the controller acts as a DALI Master and a user connects another DALI Master, or a DALI Super Master to the network. The DALI Super Master (if it does not have a Class-II power supply) may raise an error condition because the network is powered when it should not be. At the same time, the controller continuously checks the conditions on the network before sending messages to turn the master power supply off. In addition, the controller checks whether the output of the network, DALI_OUT, is high or low. If the network is de-energized, or high, there are no other DALI Masters on the network. If a low condition is detected, this is interpreted as there being at least on other DALI Master present on the network and the controller immediately switches to DALI Slave mode by switching the master power supply off.

The controller is intended to be able to: (1) As a DALI Slave, receive commands and data from a DALI Master, including non-standard commands and non-standard extensions of the DALI communication protocol relevant for its own operation, and for the operation of the ECGs and others it controls in the absence of a DALI Super Master; and (2) pass those and other commands, and receive data from, the other DALI Slaves on the network.

The actual values of the resistors of the controller circuit depend on the choice of transistors and diodes. The 3.3V or 5V power supply for the microcontroller that provides the positive voltage supply or Vdd, is sufficiently strong, such that the isolated flyback switch-mode power supply may be fun off the provided power supply, which in turn, converts Vdd to 16 VDC necessary for operating the DALI network. The power supply is of Class-II, meaning that it may co-exist with other power supplies on the network without damage by checking whether the network is energized and at what polarity.

An example of a mode or role is a semi-autonomous DALI Slave. If connected to master microcontroller (MCC), where upon turn-on the MCC configures all the DALI parameters of the DALI Slave, so later, if a DALI Super Master is connected to the network, the controller may properly identify itself to the DALI Super Master. In the absence of such configuration, the controller may remain silent and not respond to queries from the DALI Super Master. However, other operating modes may be available.

The DALI traffic initiated by the controller may be determined by the logic running in the controller, e.g., a scheduler which may command DALI Slaves on the network to do something, for example, turn themselves on at 50% power level or report their internal state. Traffic may also be determined by the data which the controller may receive from the digital communication channel (DCC). The DCC may be any of the standard embedded system interfaces, and on that channel, the controller may be either master or slave (I2C, SPI), or neither (UART). If the controller is a DALI Slave, this implies that there may be a MCC which uses the controller as a bridge for receiving and sending data and commands over the DALI network. Conversely, if the controller is a DALI Master, the controller, through the DCC, may be connected to a network of nodes through a bridge such as I2C to wireless or to radio, and communicates with other nodes and gateways in the network.

In the default state, the device acts as a DALI Slave. This implies that the logic input selection terminal, DALI_SELECT, is low and the DALI master power supply is turned-off or disconnected from the network. The controller regularly checks if there is another DALI Super Master connected to the network. It checks if the output terminal, DALI_OUT, is low indicating a Super Master is present, or high indicating a de-energized network which may imply an absent Super Master. If a DALI Super Master is connected to the network, the controller may communicate standard DALI frames (one backward frame in response to two forward frames by the Super Master) as well as non-standard DALI frames. A standard frame may be comprised of a 1 byte answer. The controller may to interpret these frames and receive standard DALI data (light levels, scenes and so forth), which the controller may later communicate to the DALI Slaves on the network. In some instances, this may save the bandwidth on the network as the Super Master may choose to communicate with the single controller once and tell it that the received data is for all of the DALI Slaves, rather than communicating with each slave individually and telling each the same message. Besides standard DALI data, the controller may be able to recognize non-standard DALI data, e.g., the DALI Super Master may upload schedules and dynamic scenes to the controller, with the instructions and how to replay them. For example, the device may receive a schedule on how to change the street-lamp light intensity during a period of operation, rather than just turn the street-lamp on at the beginning of the evening, and turn it off in the morning.

When the controller acts as a DALI Master, either its internal logic dictates or the MCC it is connected to instructed controller to be a DALI Master. The controller checks whether it may become a DALI Master first. This may be done by: (1) checking if the network is de-energized, if so, then (2) turning on the master power supply by asserting the power supply controller, DALI_PS_CNTL, to high, and after the master power supply stabilizes its output, it (3) sets DALI_SELECT to high which energizes the network. And (4) starts the network transactions in the role of DALI Master. This may be done to pass immediate commands to DALI Slaves, but also to configure them, e.g., set light scenes, verify that they are operational. In addition, the controller may perform non-standard DALI transactions in regards to the number of forward and backward-frames, and in regards to the types of information which is being communicated through the network.

Arbitration may be performed when the power supply's error terminal, DALI_PS_ERR, goes high. This occurs if it cannot operate properly, e.g., too high current draw because a DALI Super Master is present. The high error terminal may prevent the controller from becoming a DALI Master.

If the DALI Master operation of the controller was interrupted, then the controller immediately stops all DALI Master transactions, and waits to resume its operation in Master mode until after the network has become de-energized again, as this is a sign that there are no other DALI Masters on the network.

In the absence of other DALI Masters, the controller may function as a DALI Master. If other DALI Masters are present on the network, then the controller may, depending on the logic running internally, try to assert itself as a DALI Master over the other DALI Masters to send commands to other DALI Slaves on the network.

A DALI Slave or Master-on-Demand controller may assert itself as DALI Master in presence of other DALI Masters on the network. The controller monitors for time duration of Slave or Master-on-Demand Delay activity of the network. If none is observed, then depending on the network state, decides whether to turn the network master power supply. If the controller's power supply is used for energizing the network then additional time is used waiting for the voltage levels to settle. Only then does the Slave or Master-on-Demand controller starts transactions on the network as a DALI Master.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a logic truth table;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "network" used with regards to an organization of devices may additionally be referred to as a "bus" or a "DALI bus". These terms may be used interchangeably.

Figure 1:
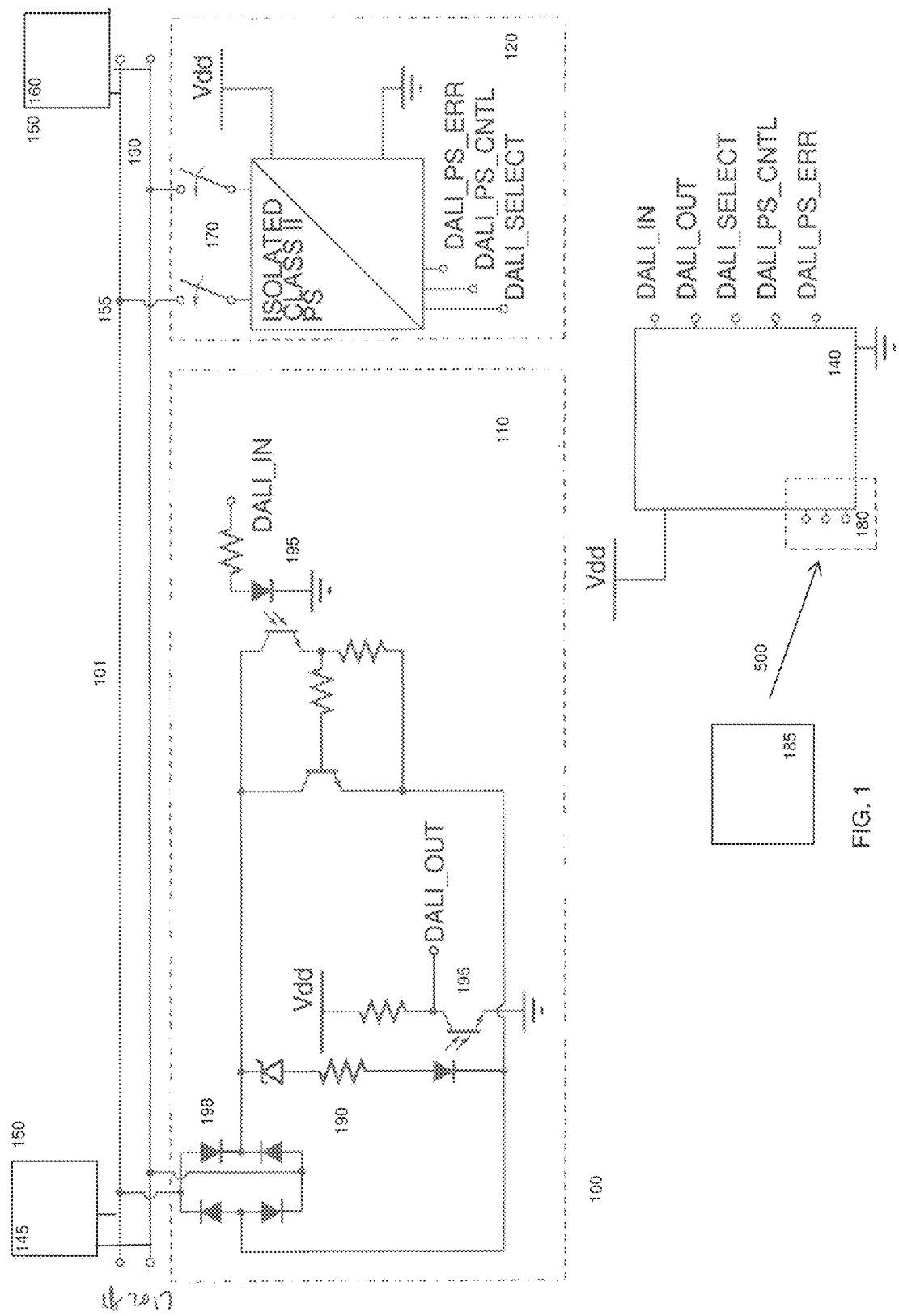
FIG. 1 shows an embodiment of a controller on a network.

FIG. 1 describes a controller 100 for accessing a network 130 of lighting system devices 150. Controller 100 may comprise a communication subsystem 110, a microcontroller 140 and a master power supply 120 with a switching feature 170 for connecting to network 130.

Network 130 may be considered a Digital Addressable Lighting Interface (DALI) network, which is a network-based system which may control lighting in a building automation or a lighting system.

Lighting system devices 150 may consist of, but are not limited to, lighting devices including LEDs, sensors and controllers, including other overriding controllers. The lighting system devices 150 may be referred to as Electronic Control Gears (ECGs).

Throughout lighting devices 145 may refer to lighting devices, sensors and non-dominant controllers. In the DALI system, lighting devices 145 may also be considered DALI Slaves.

Master lighting system device 160 may refer to a separate controller, or alternatively in the DALI system, a DALI Super Master.

Communication subsystem 110 may be used to send and receive messages on network 130. Additionally, communication subsystem 110 may be used to identify controller 100 as a node 155 on network 130 and allow controller 100 to communicate with network 130 through a first protocol 101.

Communication subsystem 110 may additionally be configured to include resistors 190, transistors 195 and diodes 198. The actual values of resistors 190 in communication subsystem 110 may depend on the choice of transistors 195 and diodes 198.

Additionally, the 3.3V or 5V power supply for microcontroller 140 that provides a positive supply voltage or Vdd, is sufficiently strong such that the isolated fly-back switch-mode power supply may be run from the supplied power, which in turns converts Vdd to 16 VDC necessary for operating network 130.

Switching feature 170 of Master power supply 120 may allow master power supply 120 to connect to network 130. Master power supply 120 may be a Class-II power supply, meaning it may co-exist with other power supplies on network 130 without causing damage.

FIG. 1 shows an embodiment of controller 100 on DALI network 130. DALI communication protocol, or first protocol 101, is a standard communication protocol intended to provide communication between lighting system devices 150. Through first protocol 101, controller 100 may be configured to detect the presence of a Master lighting device 160 on network 130. The detected presence 410 of Master lighting device 160 may contribute to an assumed role 400 of controller 100.

Master lighting device 160 is a special device in the DALI system or network 130, which may be connected or disconnected from network 130 as necessary. Master lighting device 160, and DALI Master's in general, may provide power for operating DALI Slaves or lighting system devices 150. When network 130 is energized, Master lighting device 160 is in communication with network 130. In other words, the output of network 130 may be considered low.

The presence of Master lighting device 160 may be detected 410 on network 130 by measuring an output of network 130. The output of network 130 may range from 0-16 or 19 V. When the output is in the range of around 0-6 V, the output of network 130 is low and is assigned a logic level of 0. In this case the network is energized indicating the presence 410 of Master lighting device 160. When the output of network 130 is high, the output may be in the range of 12-16 or 19 V and is assigned a logic level of 1. In this case, the output of network 130 is high and network is de-energized, indicating the absence 420 of Master lighting device 160. The logic levels which are defined by DALI standards.

If Master lighting device 160 is absent 420 from network 130, controller 100 may assume the role 400 of a DALI Master 460 on network 130. Controller 100 may initiate communications with lighting devices 145. In the role 400 of DALI Master 460, controller 100 communications may include, but are not limited to, sending queries and setting parameters. Lighting devices 145 in some cases may respond and send communication back to controller 100 if instructed to do so by controller 100.

Figure 4:
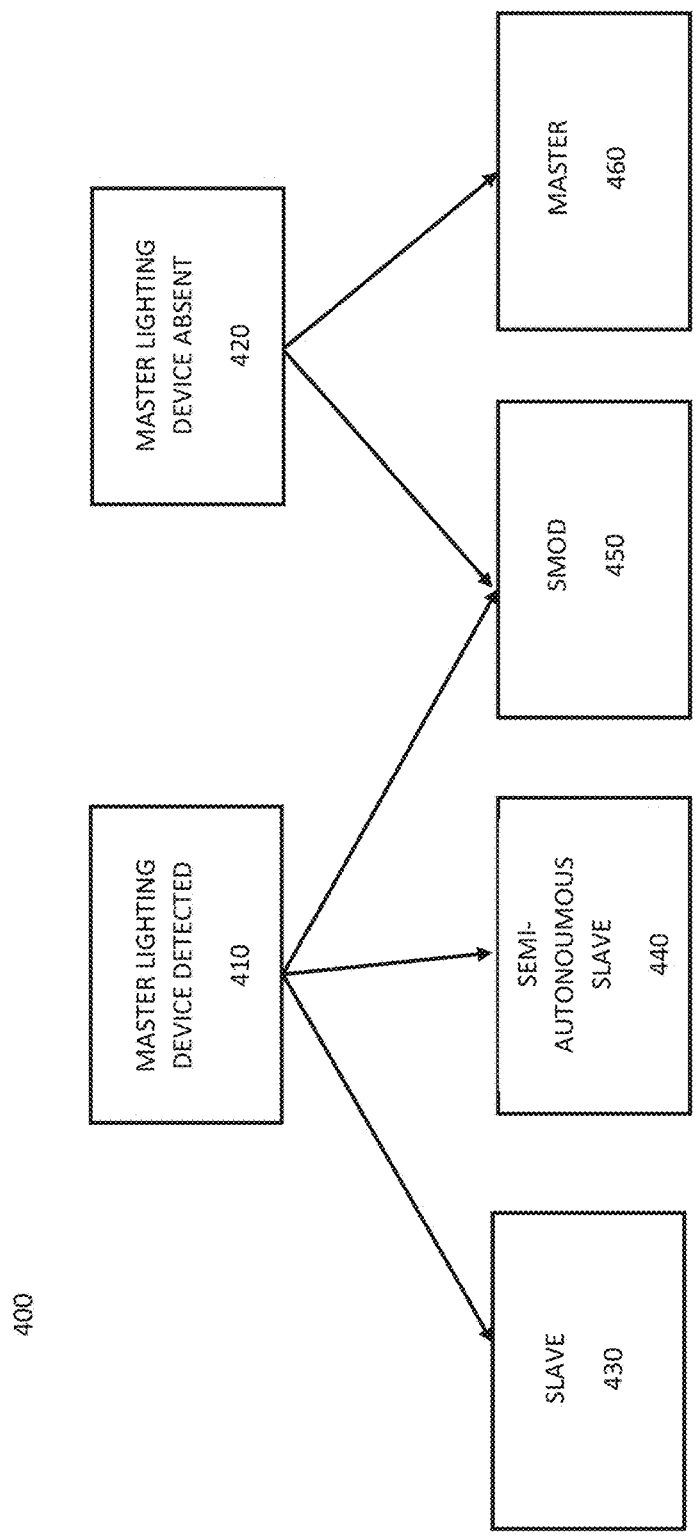
FIG. 4 shows a schematic of assumed roles of the controller.

In the event Master lighting device 160 is detected 410 on network 130 by controller 100, controller 100 may assume a variety of roles 400, as shown in FIG. 4, depending upon the configuration of controller 100. The role 400 of controller 100 on network 130 may consist of, but is not limited to, that of a DALI Slave 430, semi-autonomous DALI Slave or a Slave or Master-on-Demand (SMOD) 450.

When controller 100 assumes the role 400 of DALI Slave 430, controller 100 may receive communications from Master lighting device 160 through network 130 and if instructed to do so, may return a communication back to Master lighting device 160 through network 130 to Master lighting device 160. In this arrangement, controller 100 may be recognized as a DALI Slave on network 130 by Master lighting device 160 and be treated akin to lighting device 145. In this configuration, controller 100 is not configured to initiate or start communications with either lighting devices 145 and/or Master lighting device 160, but rather, only communicates with Master lighting device 160 if commanded to do so.

In another embodiment, controller 100 may also assume the role 400 of DALI Slave 430. First protocol 101 may comprise controller 100 receiving an exclusive communication from Master lighting device 160, where Master lighting device 160 only communicates with lighting devices 145 through controller 100. Controller 100 may be configured to receive all communications from Master lighting device 160 and pass the communication to lighting devices 145. Controller 100 may in return collectively receive communications from each lighting device 145 and communicate the received communication with Master lighting device 160. In effect, controller 100 may act as an intermediary device between Master lighting device 160 and lighting devices 145. However, lighting devices 145 and controller 100 need not return communication to controller 100 and Master lighting device 160 respectively unless instructed by Master lighting device 160 to do so. The communication initiated by Master lighting device 160 may comprise instructing controller 100 to perform some task along with passing the same instructions to each lighting devices 145 which is configured to perform the instructed task. Some examples of communications received by controller 100 from Master lighting device 160 may consist of, but are not limited to: schedules and dynamic scenes along with instructions for executing the schedule and dynamic scene. For example, controller 100 may receive a schedule on how to change the street lamp intensity during a period of operation, rather than just turn the street lamp on at the beginning of the evening and turn it off in the morning. Further Master lighting device 160 may instruct lighting device 145 to report an internal state and/or to turn on at 50% power level through controller 100.

In another embodiment in which Master lighting device 160 is detected 410 by network 130, controller 100 may assume the role 400 of semi-autonomous Slave 440. Controller 100 may be connected to an outside independent device 185, wherein independent device 185 may configure predefined parameters into controller 100. When Master lighting device 160 is connected to network 130, controller 100 may properly identify itself to Master lighting device 160 and respond to commands. However, in the absence of such a configuration, controller 100 may remain silent to Master lighting device 160 commands and not respond to any queries. Alternatively, controller 100 may be partially configured where controller 100 only responds to certain commands and queries issued by Master lighting device 160.

In another embodiment in which Master lighting device 160 is detected by network 130, controller 100 may assume the role 400 of Slave or Master-on-Demand, or SMOD 450. Controller 100 may remain in constant communication with network 130 to determine whether Master lighting device 160 is connected to network 130. When Master lighting device 160 is detected 410 controller 100 may operate as a DALI Slave 220. However, if controller 100 detects a delay 210 of activity on network 130, implying the absence 420 of Master lighting device 160, controller may initiate 235 master power supply 120 by connecting master power supply 120 through switching feature 170 to network 130. Master power supply 120 may energize or power network 130. A waiting period 240 may occur while the voltage levels of Master power supply 120 stabilize or settle. Once voltage levels on network 130 are stabilized, SMOD controller 100 may operate as a DALI Master 230. Controller 100 may initiate communication with lighting devices 145. For example, controller 100 may send instructions or commands to lighting devices 145 on network 130. In return, if controller 100 instructed, lighting devices 145 may be configured to send information to controller 100. In the event Master lighting device 160 is again connected to network 130, master power supply 120 is configured with an error terminal DALI_PS_ERR, which goes high if it cannot operate properly, such as when there is too high of a current drawn because Master lighting device 160 is present on network. Switching feature 170 may be configured to immediately disconnect master power supply 120 from network 130. In the interrupted state of controller 100, controller immediately stops all DALI Master transactions and operates as a DALI Slave. Controller 100 may continue to monitor network for de-energization which indicates that there are no Master lighting devices 160 on network 130.

Figure 2:
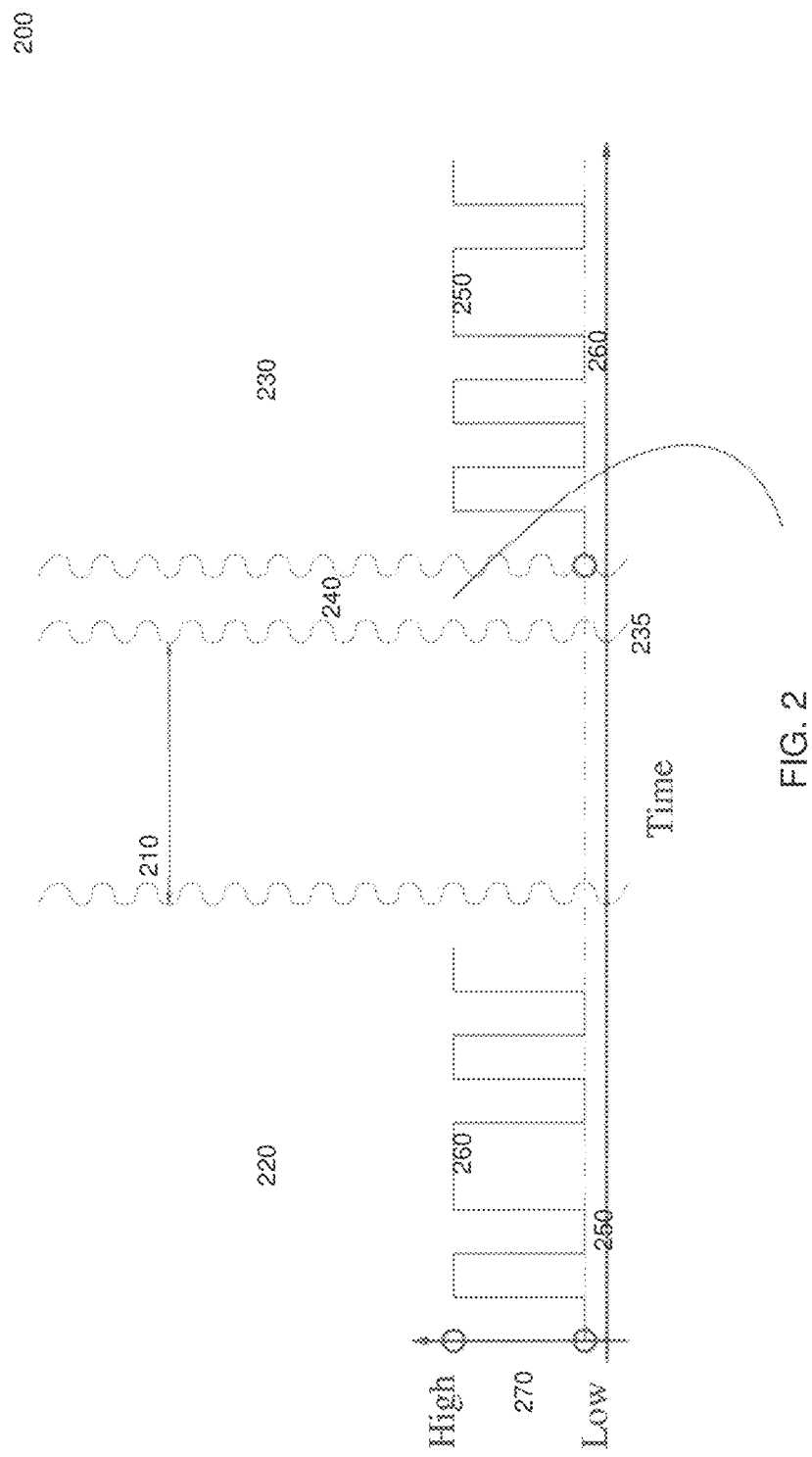
FIG. 2 shows an embodiment of a Slave or Master on Demand method.

FIG. 2 shows an embodiment of controller 100 as a DALI Slave or Master-on-Demand (SMOD) 200, where controller 100 may assert itself as a DALI Master even when independent device 160 is present on network 130. Network state 270 may indicate whether network 130 output is high, indicating an absence of communication 260 from Master lighting device 160, or low, indicating a communication 260 by Master lighting device 160. Master lighting device 160 initiated communications 220 shows a standard DALI Master to DALI Slave communication or Master lighting device 160 to controller 100 communication. Delay 210 may occur where a period of network 130 inactivity may occur while the DALI-Master function of controller 100 is assessed. Delay 210 may occur when there is an long absence of communication from Master lighting device 160. Delay 210 may be greater than 100 ms. After Delay 210, master power supply 120 may be switched on 235. A waiting period 240 may occur if network 130 is too high after switching 235 master power supply 120. Waiting period 240 may allow the voltage levels on network 130 to stabilize after master power supply 120 energizes network 130. Following waiting period 240, a communication initiated by controller 100 operating as DALI Master 230 shows a standard DALI Master to DALI Slave communication. As a note, in the region where controller 100 acts as DALI Slave 220 are reversed from when controller 100 operates as DALI Master 230.

FIG. 3 shows truth table 300 for network 130 which is a DALI network. Microcontroller 140 selects the logic of controller 100. In the event controller 100 is configured as a DALI Master, the received RX network output or DALI_OUT of communication subsystem 110 is high prompting microcontroller 140 to select a logic level of 1, as indicated by DALI_SELECT, and may communication the selection to communication subsystem 110 and master power supply 120. Truth table 300 indicates an unreversed logic levels in TX of DALI_OUT and RX of the network input by controller 100 or DALI_IN. In the event controller 100 is configured as a DALI Slave, the received RX network output or DALI_OUT of communication subsystem 110 is low, prompting microcontroller 140 to select a logic level of 0 and may communicate the selection to communication subsystem 110 and master power supply 120.

The logic of network 130 may be determined by the output of network 130. Generally, the output is in the range of 0 V to 16 or 19 V. If output is less than approximately 6V, then the logic is 0. However if the network output is higher than 10 or 12 V, then the logic is 1. These values are determined through DALI standards.

Controller 100 may be further configured to communicate with an independent device 185 through a second protocol 500. Controller 100 may further comprise a communication channel 180. Communication channel 180 may, for example, be a wireless module, a radio module or a Zigbee module. In effect controller 100 may act as a bridge to network 130 for independent device 185, able to control lighting devices 145 while allowing direct control of the electronic communication gateway (ECG) that may be connected to network 130. Independent device 185 may be configured outside DALI network 130. Digital communication channel 180 may comprise any of the standard embedded system interfaces. On digital communication channel 180 controller may be either master or slave while using I2C and SPI standard interfaces, or may be neither master nor slave using UART standard interface. If controller 100 operates as a DALI Master, digital communication channel 180 may connect outside device 185 to network 130 through controller 100 and digital communication channel 180. Digital communication channel 180 may be connected to an array of nodes through a bridge, such as I2C or wireless or to radio, and communicates with other nodes and gateways on network 130. Controller 100 may be configured to interface between first protocol 101 and second protocol 500.

Default mode of operation of controller 100 in a DALI embodiment is as a DALI Slave. In which case, master power supply 120 may be switched off through switching feature 170. Switching feature 170 may be turned off through DALI_SELECT input by microcontroller 140. As DALI Slave, only communication subsystem 110 is configured to be operational.

Controller 100 may revert to the default mode of operation when not actively acting in the role 400 of DALI Master 460, which may save energy. Upon completion of tasks by controller 100 operating in the role 400 of DALI Master 460, controller 100 may be switched to DALI Slave by switching off switching feature 170 of master power supply 120.

Example 1 comprises, a controller for accessing a network of lighting system devices, the controller comprising: a communication subsystem configured to allow the controller to be identified as a node on said network, and to communicate according to a first protocol with at least one of said lighting system devices on the network; wherein the controller is configured to detect the presence of a Master lighting system device on the network via the first protocol; wherein the controller is configured to assume a role based on the detection.

In Example 2, the controller of Example 1, wherein the network is a DALI network.

In Example 3, the controller of Example 1-2 wherein the first protocol is a DALI communication protocol.

In Example 4, the controller of Example 1-3 wherein the role is a DALI Slave role.

In Example 5 the controller of Example 1-3 wherein the role is a DALI Master role.

In Example 6 the controller of Example 1-3 wherein the role is a DALI Slave and Master-on-Demand.

In Example 7 the controller of Example 4, wherein the DALI Slave role indicates a Master lighting system device on the network.

In Example 8 the controller of Example 7, wherein the Master lighting system device is configured to communicate with the controller through the first protocol.

In Example 9 the controller of Example 7-8, wherein the controller is configured to receive communication with the Master lighting system through the first protocol.

In Example 10 the controller of Example 7-9, wherein the controller is configured to send a communication to the Master lighting system through the first protocol.

In Example 11, the controller of Example 5, wherein the DALI Master role indicates the absence of a Master lighting system device on the network.

In Example 12, the controller of Example 11, wherein the controller further comprises a master power supply.

In Example 13, the controller of Example 12, wherein the master power supply comprises a switching feature.

In Example 14, the controller of Example 12-13, wherein the switching feature is connected to the network in the DALI Master role.

In Example 15, the controller of Example 12-14, wherein the master power supply is configured to power the network.

In Example 16, the controller of Example 11-15, wherein the controller is configured to initiate communication with the lighting system devices through the first protocol.

In Example 17, the controller of Example 11-16, wherein the controller is configured to receive communication with the lighting system devices through the first protocol.

In Example 18, the controller of Example 1-3, wherein the role is a semi-autonomous DALI Slave.

In Example 19, the controller of Example 18, wherein network further comprises a master microcontroller.

In Example 20, the controller of Example 18-19, wherein the master microcontroller is configured to configure the controller to predetermined parameters of communication.

In Example 21, the controller of Example 20, wherein the controller is configured to communicate only the predetermined parameters with the Master lighting device.

In Example 22, the controller of Example 20, wherein the controller is configured to not communicate with the Master lighting device outside the predetermined parameters.

In Example 23, the controller of Example 6, wherein the controller is configured to operate as a DALI Master while the presence of the Master lighting device is detected on the network after a predetermined amount of inactivity.

In Example 24, the controller of Example 23, wherein the controller further comprises a master power supply.

In Example 25, the controller of Example 24, wherein the master power supply comprises a switching feature.

In Example 26, the controller of Example 24-25, wherein the switching feature is connected to the network in the DALI Master role.

In Example 27, the controller of Example 24-26, wherein the master power supply is configured to power the network.

In Example 28, the controller of Example 1-27, wherein the controller further comprises a microcontroller.

In Example 29, the controller of Example 28, wherein the microcontroller is configured to provide control logic to the controller.

In Example 30, the controller of Example 29, wherein the control logic is configured to allow the controller to operate in the role based on the detection.

In Example 31, the controller of Example 28-29 wherein the microcontroller further comprises a digital communication channel, wherein the microcontroller is configured to communicate with a master microcontroller though a digital communication channel via a second protocol.

In Example 32, the controller of Example 31, wherein the communication channel comprises a pluggable module.

In Example 33, the controller of Example 31, wherein the communication channel comprises a wireless module.

In Example 34, the controller of Example 31, wherein the communication channel comprises a radio module.

In Example 35, the controller of Example 31, wherein the communication channel comprises a Zigbee module.

Example 36 comprising, a method for a controller accessing a network of lighting devices comprising: identifying the controller as a node on said network through a communication subsystem; communicating according to a first protocol with at least on of said lighting devices on the network; determining the presence of a Master lighting device on the network; and assuming a role based on the detection.

In Example 37, the method of Example 36, wherein the network is a DALI network.

In Example 38, the method of Example 36-37, wherein the first protocol is a DALI communication protocol.

In Example 39, the method of Example 36-38, further comprising assuming a DALI Slave role.

In Example 40, the method of Example 36-38, further comprising assuming a DALI Master role.

In Example 41, the method of Example 36-38, further comprising assuming a DALI Slave and Master-on-Demand role.

In Example 42, the method of Example 38, further comprising detecting the Master lighting system device on the network.

In Example 43, the method of Example 42, further comprising the Master lighting system device communicating with the controller through the first protocol.

In Example 44, the method of Example 42-43, further comprising the controller receiving communication from the Master lighting system through the first protocol.

In Example 45, the method of Example 42-44, further comprising the sending a communication to the Master lighting system through the first protocol.

In Example 46, the method of Example 40, further comprising the controller detecting the absence of a Master lighting system device on the network.

In Example 47, the method of Example 46, wherein the controller further comprises a master power supply.

In Example 48, the method of Example 47, wherein the master power supply comprises a switching feature.

In Example 49, the method of Example 48, further comprising switching the switching feature to the network.

In Example 50, the method of Example 46-49, wherein the master power supply powers the network.

In Example 51, the method of Example 46-50, further comprising the controller initiating communication with the lighting system devices through the first protocol.

In Example 52, the method of Example 46-51, wherein the controller receives communication with the lighting system devices through the first protocol.

In Example 53, the method of Example 36-38, further comprising assuming a semi-autonomous DALI Slave role.

In Example 54, the method of Example 53, wherein the network further comprises a master microcontroller.

In Example 55, the method of Example 53-54, wherein the master microcontroller configures the controller to pre-determined parameters of communication.

In Example 56, the method of Example 55, wherein the controller communicates only the predetermined parameters with the Master lighting device.

In Example 57, the method of Example 55, wherein the controller ignores communication with the Master lighting device outside the predetermined parameters.

In Example 58, the method of Example 41, wherein the controller is configured to operate as a DALI Master while the presence of the Master lighting device is detected on the network after a predetermined amount of inactivity.

In Example 59, the method of Example 58, the controller further including a master power supply.

In Example 60, the method of Example 59, wherein the master power supply comprises a switching feature.

In Example 61, the method of Example 59-60, further comprising connecting the switching feature to the network in the DALI Master role.

In Example 62, the method of Example 59-61, further comprising using the master power supply to power the network.

In Example 63, the method of Example 36-62, the controller including a microcontroller.

In Example 64, the method of Example 63, the microcontroller providing control logic to the controller.

In Example 65, the method of Example 64, the control logic allowing the controller to operate in the role based on the detection.

In Example 66, the method of Example 63-64 wherein the microcontroller including a digital communication channel, the communication channel communicating with a master microcontroller though a digital communication channel via a second protocol.

In Example 67, the method of Example 66, wherein the communication channel comprises a pluggable module.

In Example 68, the method of Example 66, wherein the communication channel comprises a wireless module.

In Example 69, the method of Example 66, wherein the communication channel comprises a radio module.

In Example 70, the method of Example 67, wherein the communication channel comprises a Zigbee module.

Example 71 comprises, a network of lighting system devices comprising: at least one lighting system device; and a controller comprising: a communication subsystem configured to allow the controller to be identified as a node on said network, and to communicate according to a first protocol with at least one of said lighting system devices on the network; wherein the controller is configured to detect the presence of a Master lighting system device on the network via the first protocol; wherein the controller is configured to assume a role based on the detection.

In Example 72, the controller of Example 71, wherein the network is a DALI network.

In Example 73, the controller of Example 71-72 wherein the first protocol is a DALI communication protocol.

In Example 74, the controller of Example 71-73 wherein the role is a DALI Slave role.

In Example 75 the controller of Example 71-73 wherein the role is a DALI Master role.

In Example 76 the controller of Example 71-73 wherein the role is a DALI Slave and Master-on-Demand.

In Example 77 the controller of Example 74, wherein the DALI Slave role indicates a Master lighting system device on the network.

In Example 78 the controller of Example 77, wherein the Master lighting system device is configured to communicate with the controller through the first protocol.

In Example 79 the controller of Example 77-78, wherein the controller is configured to receive communication with the Master lighting system through the first protocol.

In Example 80 the controller of Example 77-79, wherein the controller is configured to send a communication to the Master lighting system through the first protocol.

In Example 81, the controller of Example 75, wherein the DALI Master role indicates the absence of a Master lighting system device on the network.

In Example 82, the controller of Example 81, wherein the controller further comprises a master power supply.

In Example 83, the controller of Example 82, wherein the master power supply comprises a switching feature.

In Example 84, the controller of Example 82-83, wherein the switching feature is connected to the network in the DALI Master role.

In Example 85, the controller of Example 82-84, wherein the master power supply is configured to power the network.

In Example 86, the controller of Example 81-85, wherein the controller is configured to initiate communication with the lighting system devices through the first protocol.

In Example 87, the controller of Example 81-86, wherein the controller is configured to receive communication with the lighting system devices through the first protocol.

In Example 88, the controller of Example 71-73, wherein the role is a semi-autonomous DALI Slave.

In Example 89, the controller of Example 88, wherein the network further comprises a master microcontroller.

In Example 90, the controller of Example 78-79, wherein the master microcontroller is configured to configure the controller to predetermined parameters of communication.

In Example 91, the controller of Example 90, wherein the controller is configured to communicate only the predetermined parameters with the Master lighting device.

In Example 92, the controller of Example 90, wherein the controller is configured to not communicate with the Master lighting device outside the predetermined parameters.

In Example 93, the controller of Example 76, wherein the controller is configured to operate as a DALI Master while the presence of the Master lighting device is detected on the network after a predetermined amount of inactivity.

In Example 94, the controller of Example 93, wherein the controller further comprises a master power supply.

In Example 95, the controller of Example 94, wherein the master power supply comprises a switching feature.

In Example 96, the controller of Example 94-95, wherein the switching feature is connected to the network in the DALI Master role.

In Example 97, the controller of Example 94-96, wherein the master power supply is configured to power the network.

In Example 98, the controller of Example 71-97, wherein the controller further comprises a microcontroller.

In Example 99, the controller of Example 98, wherein the microcontroller is configured to provide control logic to the controller.

In Example 100, the controller of Example 99, wherein the control logic is configured to allow the controller to operate in the role based on the detection.

In Example 101, the controller of Example 98-99 wherein the microcontroller further comprises a digital communication channel, wherein the microcontroller is configured to communicate with a master microcontroller though a digital communication channel via a second protocol.

In Example 102, the controller of Example 101, wherein the communication channel comprises a pluggable module.

In Example 103, the controller of Example 101, wherein the communication channel comprises a wireless module.

In Example 104, the controller of Example 101, wherein the communication channel comprises a radio module.

In Example 105, the controller of Example 101, wherein the communication channel comprises a Zigbee module.

In Example 106, the network of Example 76-105, wherein the network is a DALI network.

In Example 107, the network of Example 106, wherein the at least one lighting system devices are DALI Slaves and/or sensors.

In Example 108, the network of Examples 106-107, wherein the Master lighting device is a DALI Super Master.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A controller for accessing a network of lighting system devices, the controller comprising:
 a communication subsystem configured to allow the controller to be identified as a node on the network, and to communicate according to a first protocol with at least one of the lighting system devices on the network;
 wherein the controller is configured to detect the presence of a Master lighting system device on the network via the first protocol;
 wherein the controller is configured to assume a role based on the detection; and
 a master power supply comprising a switching feature configured to power the network when the switching feature is connected to the network.

2. The controller of claim 1, wherein the network is a DALI network.

3. The controller of claim 1, wherein the role is a DALI Slave role and the master power supply is not in connection with the network via the switching feature.

4. The controller of claim 1, wherein the role is a DALI Master role and the master power supply is in connection with the network via the switching feature.

5. The controller of claim 1, wherein the role is a DALI Slave and Master-on-Demand.

6. The controller of claim 3, wherein the DALI Slave role indicates a Master lighting system device on the network.

7. The controller of claim 4, wherein the DALI Master role indicates the absence of a Master lighting system device on the network.

8. The controller of claim 5, wherein the controller is configured to operate as a DALI Master while the presence of the Master lighting device is detected on the network after a predetermined amount of inactivity.

9. The controller of claim 1, further comprising a digital communication channel, wherein the digital communication channel is configured to communicate with an independent device through a second protocol.

10. A method for a controller accessing a network of lighting devices comprising:
 identifying the controller as a node on said network through a communication subsystem;
 communicating according to a first protocol with at least one of said lighting devices on the network;
 determining the presence of a Master lighting device on the network;
 assuming a role based on the detection; and
 controlling a switching feature of a master power supply of the controller based on the assumed role,
 wherein the master power supply is configured to power the network.

11. The method of claim 10, wherein the network is a DALI network.

12. The method of claim 10, further comprising detecting the presence of the Master lighting device.

13. The method of claim 12, further comprising assuming a DALI Slave and Master-on-Demand role.

14. The method of claim 12, further comprising operating the controller as a DALI Slave on the network, wherein the master power supply is not in connection with the network via the switching feature.

15. The method of claim 14, further comprising:
   detecting a delay in communication from the Master lighting device;
   switching the switching feature of the master power supply of the controller to the network;
   powering the network with the master power supply;
   issuing commands from the controller to the network.

16. The method of claim 15, further comprising:
   detecting a communication from the Master lighting device; and
   disconnecting the switching feature of the master power supply from the network.

17. The method of claim 10, further comprising:
   communicating with an independent device according to a second protocol,
   wherein the second protocol is configured to communicate through a digital communication channel in the controller.

18. The method of claim 17, further comprising:
   receiving a command from independent device; and
   relaying the command to the lighting devices.

19. A network of lighting system devices comprising:
   at least one lighting system device;
   and a controller comprising:
      a communication subsystem configured to allow the controller to be identified as a node on the network, and to communicate according to a first protocol with at least one of the lighting system devices on the network;
      wherein the controller is configured to detect the presence of a Master lighting system device on the network via the first protocol; wherein the controller is configured to assume a role based on the detection; and
      a master power supply comprising a switching feature configured to power the network when the switching feature is connected to the network.

* * * * *